Patented Jan. 1, 1935

1,986,389

UNITED STATES PATENT OFFICE 1,986,389

PRODUCT AND PROCESS FOR RUBBER COMPOUNDING

Arthur Burnham Cowdery, Needham, Mass., and Theodore A. Bulifant, Maywood, N. J., assignors to The Barrett Company, New York, N. Y., a corporation of New Jersey No Drawing. Original application March 14, 1929, Serial No. 347,166. Divided and this application December 29, 1930, Serial No. 505,461

6 Claims. (Cl. 106—23)

This application is a division of our co-pending application Serial No. 347,166, filed March 14, 1929.

This invention relates to rubber compounding and more particularly to a process for compounding rubber involving the use of a softening or dispersing agent. The invention also relates to the rubber compound resulting from the practice of this invention and also to the softening and/or dispersing agent employed in accordance with our invention.

Heretofore palm oil, pine tar, mineral rubber, various pitches and tars, and other like materials have been added to the rubber mix for the purpose of dispersing the fillers such as carbon black, zinc oxide, clays, etc., used in rubber compounding.

Coal tar distillate oil has also been used in rubber compounding. The oil of this type heretofore used in the industry consisted, for example, of a fraction of about 1.165 specific gravity at 38° C. and boiling around 300° C., and after cooling contained a substantial amount of crystalline material which probably consisted principally of naphthalene, anthracene, phenanthrene and other hydrocarbons of high molecular weight. Use of this oil has proven relatively satisfactory in so far as its softening and dispersing qualities are concerned, but has been found to frequently result in serious discoloration of the finished rubber product and other difficulties in handling and processing.

One object of this invention is to provide an agent free from the above objections to the compounds heretofore used for dispersing the fillers used in rubber compounding which will improve the dispersion of the filler in the resultant product and avoid the difficulties heretofore encountered in processing the rubber and discoloration of the rubber product. Improved dispersion of fillers in a rubber compound results in enhancement of the physical properties thereof, particularly the resistance of the compound or article to abrasion or wear. Another object of this invention is to provide a process for compounding rubber which yields a rubber product having a greater tensile strength, greater resistance to tear and to abrasion, and greater resistance to cracking under repeated flexing, and also having improved aging qualities. Other objects and advantages will appear from the following detailed description.

We have discovered that the above difficulties attendant upon the use of coal tar oil as heretofore practiced are overcome by employing coal tar oil of proper specific gravity and boiling point from which has been eliminated the crystalline material which forms therein upon standing and cooling to normal temperatures. In accordance with our invention a coal tar oil fraction is selected which, after removal of crystalline material therefrom, will have a specific gravity above substantially 1.06 at 38° C. and will boil above substantially 200° C., and the oil is permitted to cool to about 25° C. and stand until the crystalline material which forms therein has settled. The resultant clear oil is then removed, for example by decantation. The limpid oil so produced when compounded with rubber in accordance with the usual procedure of forming a desired rubber compound functions both as a softening and dispersing agent. One such oil which we have employed is the medium distillate obtained from the distillation of coal tar and having a specific gravity of 1.066 at 38° C., and which when distilled to the temperatures below indicated in the column at the left gives off the percentages by weight of distillate indicated by the figures opposite the temperature figures.

|  | Per cent |
|---|---|
| 210° C | 0.7 |
| 235° C | 6.9 |
| 300° C | 51.6 |

Another example of a coal tar oil which we have found to be particularly suitable as a softening or dispersing agent in the compounding of rubber is the heavy distillate obtained from coal tar having a specific gravity of 1.147 at 38° C., and which when distilled to the temperatures below indicated in the column at the left gives off the percentages by weight of distillate indicated by the figures transversely opposite the corresponding temperature figures:

|  | Per cent |
|---|---|
| 210° C | — |
| 235° C | — |
| 300° C | 5.1 |
| 315° C | 7.4 |
| 355° C | 20.2 |

As indicated, an excess of 90% of the oil defined in the above example boils at temperatures above about 300° C.

As previously noted, these oils are obtained as distillate fractions from the usual distillation of coal tar such as coke oven tar and the like and may consist of a single fraction or a mixture of two or more fractions. The oils are permitted to settle and the resultant clear oil free or substantially free from crystals or suspended materials at 25° C., i. e. limpid oils, are utilized for the compounding of rubber.

These oils, we have found, possess peculiarly valuable properties as softening and dispersing agents for the various pigments and fillers, such as carbon black, zinc oxide, clays, etc., used in rubber compounding. The rubber compound or article containing our improved dispersing agent may be formed by any of the usual or well known methods of rubber compounding.

To illustrate the advantages of this invention the details and results of several tests, made in accordance with standard and well-known methods of the rubber industry on rubber compounds each involving the same amount of dispersing agent, two of which involve the use of our invention and the other of which involves pine tar which has heretofore been generally accepted as a good dispersing agent, are given below:

| | Rubber compound involving 5.40 parts of pine tar | Rubber compound involving 5.40 parts of coal tar oil having a specific gravity of 1.066 at 38° C. | Rubber compound involving 5.40 parts of coal tar oil having a specific gravity of 1.147 at 38° C. |
|---|---|---|---|
| | Parts by weight | Parts by weight | Parts by weight |
| Softener or dispersing agent | 5.40 | 5.40 | 5.40 |
| Smoked sheet (rubber) | 60.00 | 60.00 | 60.00 |
| Carbon black | 24.00 | 24.00 | 24.00 |
| Zinc oxide | 5.00 | 5.00 | 5.00 |
| Stearic acid | 2.40 | 2.40 | 2.40 |
| Antioxidant | 1.00 | 1.00 | 1.00 |
| Sulfur | 1.75 | 1.75 | 1.75 |
| Accelerator | 0.45 | 0.45 | 0.45 |
| Total | 100.00 | 100.00 | 100.00 |
| RESULTS OF TESTS | | | |
| Abrasion value (Grasselli abrader) | 204 | 165 | 182 |
| Tensile strength | 4465 | 4755 | 5045 |
| After 30 days at 70° C. in standard Geer oven test | 3045 | 3670 | 3905 |

The units of abrasion loss in the above table are obtained by the following formula:

$$V = \frac{g \times 60}{s.g. \times m \times HP}$$

in which
 $g$ = grams lost by rubber sample during test
 $s.g.$ = specific gravity of sample
 $m$ = duration of test in minutes
 $HP$ = horse power consumed as determined on the Grasselli abrader in the method generally used by the trade. The tensile strength is expressed in pounds per square inch as found on the Scott testing machine by methods well known to the industry.

The above tests definitely show that rubber compounds produced in accordance with our invention have considerably greater resistance to abrasion and have superior tensile strength. The aging qualities of the resultant rubber compound are improved appreciably, as indicated by the results obtained by aging the samples for 30 days at 70° C. in the standard Geer oven test.

It will be noted that by using coal tar oils free or substantially free from crystals and suspended matter having a specific gravity above 1.06 at 38° C., preferably oils having a specific gravity from 1.06 to 1.15 at 38° C. and boiling above 200° C., as a dispersing agent in rubber compounding, the dispersion of the fillers in the resultant compound is improved and a rubber compound or article that has greater resistance to abrasion, greater tensile strength, and improved aging qualities as compared with rubber compounds heretofore produced involving the use of the usual dispersing agents, is obtained. This invention, accordingly, renders it possible to produce rubber compositions which result in rubber articles possessing greater wearing qualities than articles heretofore obtained and is applicable to the manufacture of tire treads and tubes, rubber heels and soles, and various mechanical rubber goods where the improved qualities imparted are desirable.

In addition to the above advantages the oils of our invention have very much less tinting power or discoloring effect than coal tar oils heretofore used as shown by the appearance of the finished rubber products either immediately after cure, after long standing or after 30 days in the Geer aging oven.

The dispersing agent of our invention may, if subjected to extremely cold weather conditions in storage or in transportation deposit small amounts of crystalline sediment which, however, may be readily re-dissolved by heating the oil before use, to restore it to its normally limpid condition.

It will be understood that while preferred embodiments of this invention have been described, various changes in the details thereof might be made by those skilled in the art and, accordingly, this invention is not to be limited except as defined in the appended claims.

We claim:
1. A composition comprising rubber compounded with a coal tar oil substantially free from crystalline material at 25° C., and having a specific gravity of not substantially less than about 1.147 at 38° C.

2. A composition comprising rubber compounded with a coal tar oil and substantially free from crystalline material at 25° C., having a specific gravity not substantially less than 1.147 at 38° C., and the major portion of which boils at temperatures not less than about 300° C.

3. A composition comprising rubber compounded with a coal tar oil substantially free from crystalline material at 25° C., having a specific gravity of about 1.147 at 38° C., and about 95% of which boils at temperatures in excess of about 300° C.

4. The step in the process of compounding rubber which comprises incorporating in the rubber mix a coal tar oil substantially free from crystalline material at 25° C., and having a specific gravity of not substantially less than 1.147 at 38° C.

5. The step in the process of compounding rubber which comprises incorporating in the rubber mix a coal tar oil substantially free from crystalline material at 25° C., having a specific gravity of not substantially less than 1.147 at 38° C. and the major portion of which boils at temperatures not less than 300° C.

6. The step in the process of compounding rubber which comprises incorporating in the rubber mix a coal tar oil substantially free from crystalline material at 25° C., having a specific gravity of about 1.147 at 38° C., and about 95% of which boils at temperatures in excess of about 300° C.

ARTHUR BURNHAM COWDERY.
THEODORE A. BULIFANT.